United States Patent
Kim et al.

(10) Patent No.: US 10,310,972 B1
(45) Date of Patent: Jun. 4, 2019

(54) MEMORY APPARATUS AND METHOD OF WEAR-LEVELING OF A MEMORY APPARATUS

(71) Applicant: SK hynix Inc., Icheon-si Gyeonggi-do (KR)

(72) Inventors: Donggun Kim, Hwaseong-si (KR); Yong Ju Kim, Seoul (KR); Do Sun Hong, Icheon-si (KR)

(73) Assignee: SK hynix Inc., Icheon-si, Gyeonggi-do (KR)

(*) Notice: Subject to any disclaimer, the term of this patent is extended or adjusted under 35 U.S.C. 154(b) by 0 days.

(21) Appl. No.: 16/271,431

(22) Filed: Feb. 8, 2019

Related U.S. Application Data

(62) Division of application No. 15/821,291, filed on Nov. 22, 2017, now Pat. No. 10,223,255.

(30) Foreign Application Priority Data

Mar. 10, 2017 (KR) .................. 10-2017-0030848

(51) Int. Cl.
  *G11C 16/04* (2006.01)
  *G06F 12/02* (2006.01)

(52) U.S. Cl.
  CPC .. *G06F 12/0246* (2013.01); *G06F 2212/7201* (2013.01); *G06F 2212/7211* (2013.01)

(58) Field of Classification Search
  CPC ......... G06F 12/0246; G06F 2212/7201; G06F 2212/7211; G11C 16/04
  USPC ....................... 365/185.01–185.33
  See application file for complete search history.

(56) References Cited

U.S. PATENT DOCUMENTS

| | | | |
|---|---|---|---|
| 8,537,613 B2 * | 9/2013 | Sinclair | G11C 11/5628 365/185.05 |
| 8,625,346 B2 * | 1/2014 | Roohparvar | G11C 11/5628 365/185.03 |
| 2012/0324141 A1 | 12/2012 | Seong et al. | |
| 2014/0369124 A1 * | 12/2014 | Moon | G11C 16/16 365/185.11 |

* cited by examiner

*Primary Examiner* — Harry W Byrne
(74) *Attorney, Agent, or Firm* — William Park & Associates Ltd.

(57) ABSTRACT

A memory apparatus and a method of wear-leveling of a memory apparatus may be provided. The memory apparatus may include a memory having a plurality of storage blocks and a plurality of free blocks. The memory apparatus may include a memory controller configured for performing a first global wear-leveling to move data of a first storage block, which is a hot block among the storage blocks, to a first free block among the free blocks. The memory apparatus may include a memory controller configured for remapping a result of a logic operation of a logical page address of each of the pages in the first storage block and a first security refresh key to a physical page address of each of the pages in the first free block.

10 Claims, 18 Drawing Sheets

1st Refresh

2nd Refresh

1st Refresh

2nd Refresh

3rd Refresh

4th Refresh

1st Refresh

2nd Refresh

3rd Refresh

4th Refresh

MEMORY APPARATUS AND METHOD OF WEAR-LEVELING OF A MEMORY APPARATUS

CROSS-REFERENCE TO RELATED APPLICATION

The present application is a divisional application for U.S. application Ser. No. 15/821,291, filed on Nov. 22, 2017, and claims priority under 35 U.S.C 119(a) to Korean Application No. 10-2017-0030848, filed on Mar. 10, 2017, which is herein incorporated by reference in its entirety.

BACKGROUND

1. Technical Field

Various embodiments of the present disclosure may generally relate to a memory apparatus and, more particularly, to a memory apparatus and method of wear-leveling of a memory apparatus.

2. Related Art

A nonvolatile random access memory (NVRAM) such as a ferroelectric RAM (FRAM), a magnetic RAM (MRAM), a phase change RAM (PRAM), and the like, which is attracting attention as a next generation memory, has characteristics of a nonvolatile storage medium. The NVRAM has advantages, such as a power required for driving it is very low and can be accessed on in units of bytes. Currently, a NAND flash memory is widely used as the nonvolatile memory. However, the NAND flash memories have a limit in read and write operations because these read and write operations are ideally to be performed in units of pages. Additionally, the NAND flash memories have a limit in an erase operation because the erase operation is ideally to be performed in units of blocks. Accordingly, the application field of the nonvolatile memory (NVRAM) in which read and write operations are performed in units of bytes is expected to be expanded more. However, in such a nonvolatile memory (NVRAM), it is generally known that the write endurance, which is an index indicating the number of times of writing, is poor as compared with a volatile memory, and therefore, the life time of the nonvolatile memory (NVRAM) is shorter than that of the volatile memory.

Recently, there is a tendency to apply a method for extending the lifetime of a memory such as using a wear-leveling method in order to overcome reducing its lifetime. By applying wear-leveling, it is possible to cause write operations to relatively less used areas among the areas of the memory to be made so that the memory is uniformly consumed for all areas. In other words, it is possible to suppress shortening of the lifetime of the memory due to a specific area by suppressing intensive writing to a specific area of the memory. Such a wear-leveling process is generally performed by a memory controller irrespective of a host, e.g. a processor.

In designing a nonvolatile memory, wear-leveling performed in normal operations of the memory should be considered, but it is also necessary to consider shortening of the memory lifetime due to malicious exploit and a compromised operating system (OS). Otherwise, though the lifetime of the nonvolatile memory can be extended by wear-leveling, consumption of the nonvolatile memory is intensively concentrated on a specific area by the purposefully designed malicious writing code, so that the nonvolatile memory may not operate at all.

SUMMARY

A memory apparatus according to an embodiment of the present disclosure may be provided. The memory apparatus may include a memory having a plurality of storage blocks and a plurality of free blocks. The memory apparatus may include a global wear-leveler configured for performing a first global wear-leveling to move data of a first storage block, which is a hot block among the storage blocks, to a first free block among the free blocks. The memory apparatus may include an address remapper configured for remapping a result of a logic operation of a logical page address of each of pages in the first storage block in the first global wear-leveling and a first security refresh key to a physical page address of each of the pages in the first free block.

A method of wear-leveling of a memory apparatus according to an embodiment of the present disclosure may be provided. The method may include allocating a plurality of storage blocks and a plurality of free blocks in a memory. The method may include performing a first global wear-leveling to move data of a first storage block, which is a hot block among the storage blocks, to a first free block among the free blocks, a result of a logic operation of a logical page address of each of pages in the first storage block and a first security refresh key being remapped to a physical page address of each of pages in the first free block.

A memory apparatus according to an embodiment of the present disclosure may be provided. The memory apparatus may include a memory having a plurality of storage blocks and a plurality of free blocks. The memory apparatus may include a memory controller configured for performing a first global wear-leveling to move data of a first storage block, which is a hot block among the storage blocks, to a first free block among the free blocks. The memory apparatus may include a memory controller configured for remapping a result of a logic operation of a logical page address of each of the pages in the first storage block and a first security refresh key to a physical page address of each of the pages in the first free block.

DETAILED DESCRIPTION

In the following description of the embodiments, it will be understood that the terms "first" and "second" are intended to identify an element, but not used to define only the element itself or to mean a particular sequence. In addition, when an element is referred to as being located "on", "over", "above", "under" or "beneath" another element, it is intended to mean relative position relationship, but not used to limit certain cases that the element directly contacts the other element, or at least one intervening element is present therebetween. Further, when an element is referred to as being "connected" or "coupled" to another element, the element may be electrically or mechanically connected or coupled to the other element directly, or may form a connection relationship or coupling relationship by replacing the other element therebetween.

Various embodiments may be directed to a memory apparatus having a wear-leveler capable of preventing memory destruction due to malicious exploit and a compromised operating system by performing wear-leveling between blocks using a security refresh key and a method of wear-leveling between blocks in such a memory apparatus.

Figure 1:
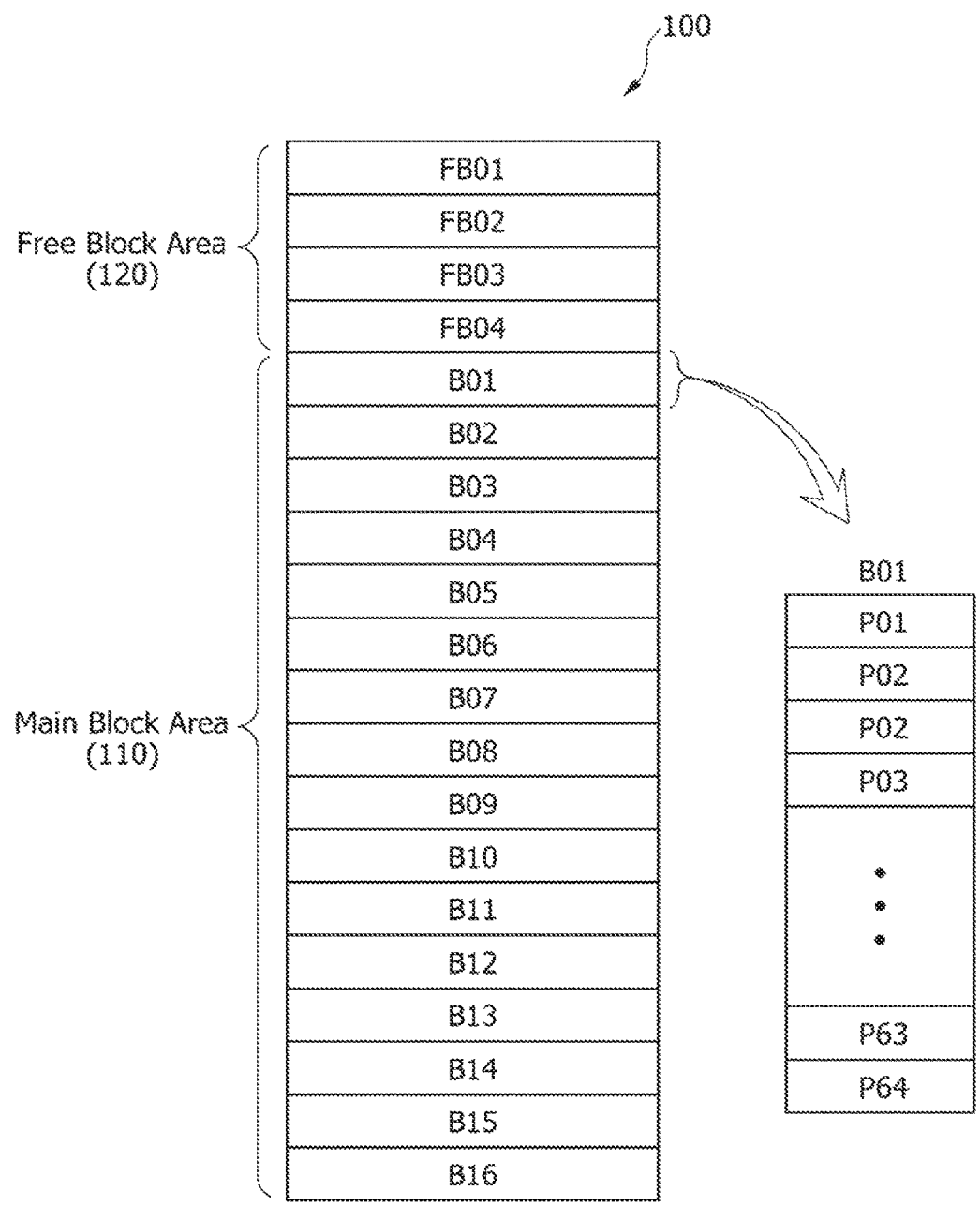
FIG. 1 is a view illustrating a block configuration of a nonvolatile memory of a memory apparatus according to an embodiment of the present disclosure.

FIG. 1 is a view illustrating a block configuration of a nonvolatile memory 100 of a memory apparatus according to an embodiment of the present disclosure. Referring to FIG. 1, the nonvolatile memory 100 may include a main block area 110 and a free block area 120. The main block area 110 may be defined as an area in which a series of allocated storage blocks B01-B16 are arranged. The storage blocks B01-B16 may be defined as areas of block units, in which write data transmitted from a host through a memory controller in response to a write command is stored. Although 4K storage blocks, i.e., 16 storage blocks are exemplified in this embodiment, but this is only one example and more or less storage blocks may be arranged. As illustrated, a first storage block B01 may include 64 pages P01-P64. Although it is not illustrated, each of the remaining storage blocks B02-B16 may include 64 pages P01-P64 in the same manner as the first storage block B01. The free block area 120 may be defined as an area in which a plurality of free blocks, for example, four free blocks FB01-FB04 are arranged. Each of the free blocks FB01-FB04 may be defined as an area of block units, which can replace a hot block in a global wear-leveling process performed between blocks. For this purpose, each of the free blocks FB01-FB04 may be an empty block in which no data is stored. In various embodiments, the number of the free blocks in the free block area 120 may be varied. In various embodiments, the number of pages in a storage block may be varied.

Each of the free blocks FB01-FB04 of the nonvolatile memory 100 may be used as a victim block. The victim block may be defined the free block to which data of a storage block determined as a hot block by a first global wear-leveling performed by the memory apparatus according to an embodiment of the present disclosure is moved. In the first global wear-leveling process, the main block area 110 and the free block area 120 may be temporarily expanded or reduced within the nonvolatile memory 100. That is, data stored in any one hot block among the storage blocks B01-B16 in the main block area 110 may be moved to any one of the free blocks FB01-FB04 in the free block area 120 through the first global wear-leveling process. In this process, the free block to which the data has been moved may be changed to a storage block. As one of the free blocks is changed to a storage block, the block that has belonged to the free block area 120 may belong to the main block area 110, so that the main block area 110 may be expanded and the free block area 120 may be reduced.

In this manner, the temporary expansion of the main block area 110 and the temporary reduction of the free block area 120 can be restored through a second global wear-leveling process. For example, through the second global wear-leveling process, data stored in any one cold block among the storage blocks B01-B16 may be moved to the storage block emptied by the first global wear-leveling process. In this case, the storage block that has been the cold block may become empty, and the empty storage block may be changed to a free block. The area where the changed free block is located is changed from the main block area 110 to the free block area 120 so that the main block area 110 and the free block area 120 are restored to have their original capacities.

Figure 2:
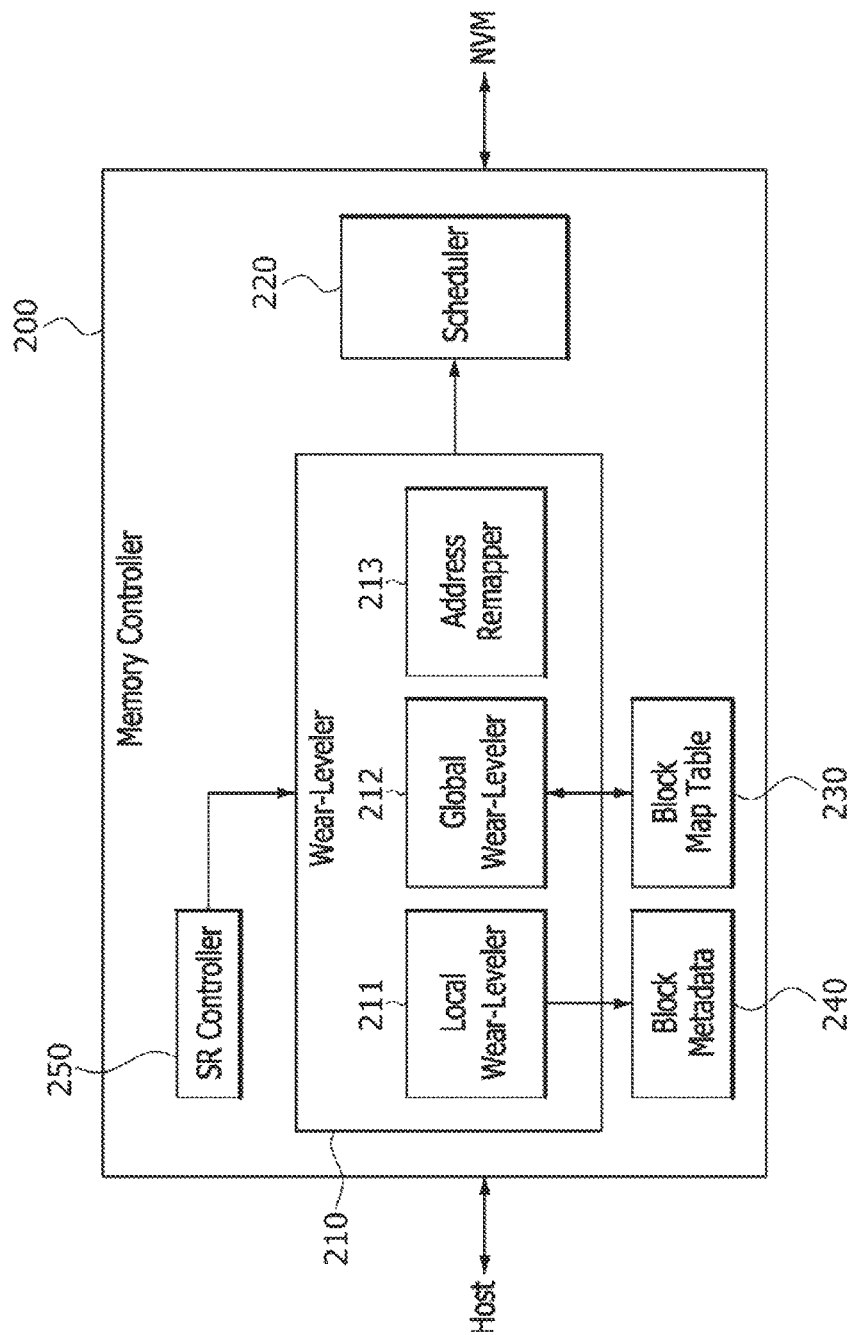
FIG. 2 is a block diagram illustrating a memory controller of a memory apparatus according to an embodiment of the present disclosure.

FIG. 2 is a block diagram illustrating a memory controller 200 of a memory apparatus according to an embodiment of the present disclosure. Referring to FIG. 2, the memory controller 200 may perform controlling a nonvolatile memory (NVM) between a host and the nonvolatile memory according to a command from the host or according to an algorithm executed on its own. The nonvolatile memory (NVM) may have substantially the same block configuration as that described with reference to FIG. 1. In an embodiment, the memory controller 200 may write data transmitted from the host in the nonvolatile memory in response to a write command from the host. In addition, the memory controller 200 may read data stored in the nonvolatile memory and transmit the data to the host in response to a read command from the host. The memory controller 200 may perform scheduling of read and write (read/write) operations for the nonvolatile memory according to an internal scheduling algorithm. The memory controller 200 may perform wear-leveling for the nonvolatile memory according to an internal wear-leveling algorithm. The memory controller 200 may also perform wear-leveling for the nonvolatile memory by an external wear-leveling command. The memory controller 200 according to an embodiment may include a wear-leveler 210, a scheduler 220, block metadata 240, a block map table 230, and a security refresh (SR) controller 250.

The wear-leveler 210 may perform control operations associated with wear-leveling such that wear-leveling for the nonvolatile memory is performed. In an embodiment, the wear-leveler 210 may perform local wear-leveling and global wear-leveling. The local wear-leveling may be performed in page units within a single storage block. On the other hand, the global wear-leveling may be performed in block units. In either case, an address remapping process using a security refresh key may be performed during data movement, so that the destruction of the nonvolatile memory due to, for example but not limited to, a malicious attack can be suppressed. In an address remapping process one or more security refresh keys may be used during the movement of data. In an embodiment, for example, the one or more security refresh keys may be randomly generated. In case that the local wear-leveling is performed in page units in any one storage block, that is, when page data in any one storage block is moved to another page in the same storage block, a physical page address of the page data to be moved may be remapped to a new physical page address through a security refresh process using a security refresh key. Likewise, in case that the global wear-leveling is performed in block units, that is, when all the page data in any one storage block is moved to any one free block or another storage block, a physical page address of each of the page data to be moved may be remapped to a new physical page address through the security refresh process using a security refresh key.

The wear-leveler 210 may include a local wear-leveler 211, a global wear-leveler 212, and an address remapper 213. The local wear-leveler 211 may perform controlling local wear-leveling in page units in any one storage block using a security refresh key. The global wear-leveler 212 may perform controlling global wear-leveling in block units, in which data is moved from any one storage block to another storage block or a free block using a security refresh key. The global wear-leveling process may include a first global wear-leveling process and a second global wear-leveling process.

The address remapper 213 may perform remapping for a physical page address changed by a local wear-leveling process and a global wear-leveling process. In the event that, for example, a malicious attack is made to a specific block of the nonvolatile memory from outside, i.e., a host, the global wear-leveler 212 may find out a location, for example a block address of that block. Then, the global wear-leveler 212 may find out a logical page address allocated to a physical page address in the block using a security refresh key used in a security refresh process performed in page units in the block by the local wear-leveler 211. After finding out the logical page address allocated to the physical page address in the block, the global wear-leveler 212 may perform a security refresh process using the security refresh key to remap the physical page address of the block to a physical page address in another block. The remapped physical page address may be stored in the address remapper 213 while being transmitted to the scheduler 220.

The scheduler 220 may perform scheduling of read/write operations for the nonvolatile memory. In other words, the scheduler 220 may determine the order of the read and write operations so that the read/write operations for the nonvolatile memory can be efficiently performed, and allow the read and write operations to be performed according to the determined order. The scheduler 220 may perform scheduling of the local wear-leveling and global wear-leveling operations in addition to the scheduling of the read/write operations. In other words, in case that a local wear-leveling command or a global wear-leveling command from the wear-leveler 210 and information on the remapped physical page address are inputted, the scheduler 220 may determine an operation sequence for both the read/write operations and the wear-leveling operations for the non-volatile memory.

In case that data is moved from one storage block to another storage block or a free block by the global wear-leveler 212, the block map table 230 may store information on a block configuration changed during the data movement. Accordingly, it is possible to know where the storage block, which is a target storage block to be moved in the global wear-leveling process by the global wear-leveler 212, is located in the nonvolatile memory. However, in this case, even if the target storage block is found, it is impossible to know how the physical page addresses of the pages in the storage block are changed in the storage block by the wear-leveling process of the local wear-leveler 211.

The block metadata 240 may store a location of each of the pages that are wear-leveled in page units in the storage block by the local wear-leveler 211 in association with the used security refresh key. In an embodiment, metadata such as a previous key, a current key, and a current refresh pointer (CRP), that are used in a security refresh process may be stored in the block metadata 240. Therefore, information that cannot be grasped through the block map table 230, for example, information regarding how the physical page address has been changed in the storage block can be grasped using a security refresh key stored in the block metadata 240 and a corresponding physical page address.

The security refresh controller 250 may generate security refresh keys in a local wear-leveling process by the local wear-leveler 211 and a global wear-leveling process by the global wear-leveler 212, and allow security refresh processes using the generated security refresh keys to be performed. In an embodiment, the security refresh controller 250 may include a key generating unit and a logic unit. The logic unit may include an exclusive OR (XOR) operation logic.

Figure 3:
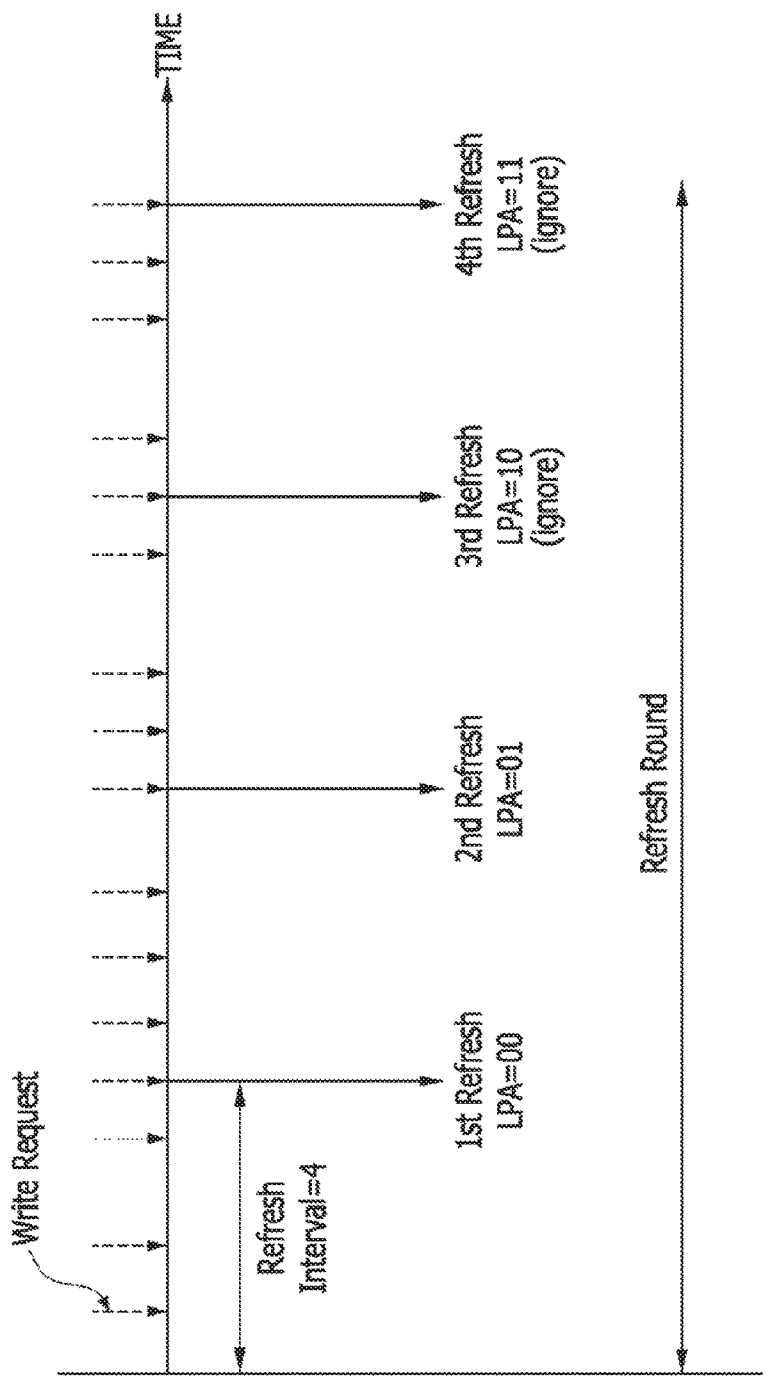
FIG. 3 is a view illustrating a refresh round in which local wear-leveling is performed.
Figure 4:
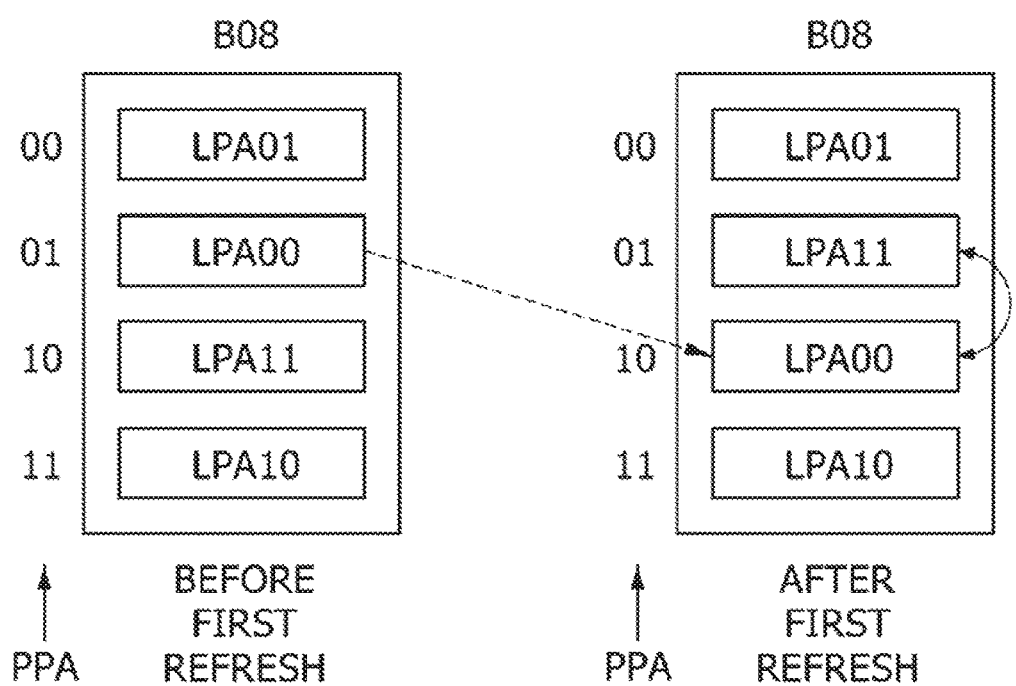
FIGS. 4 and 5 are views illustrating a remapping operation for physical page addresses by a refresh round.
Figure 5:
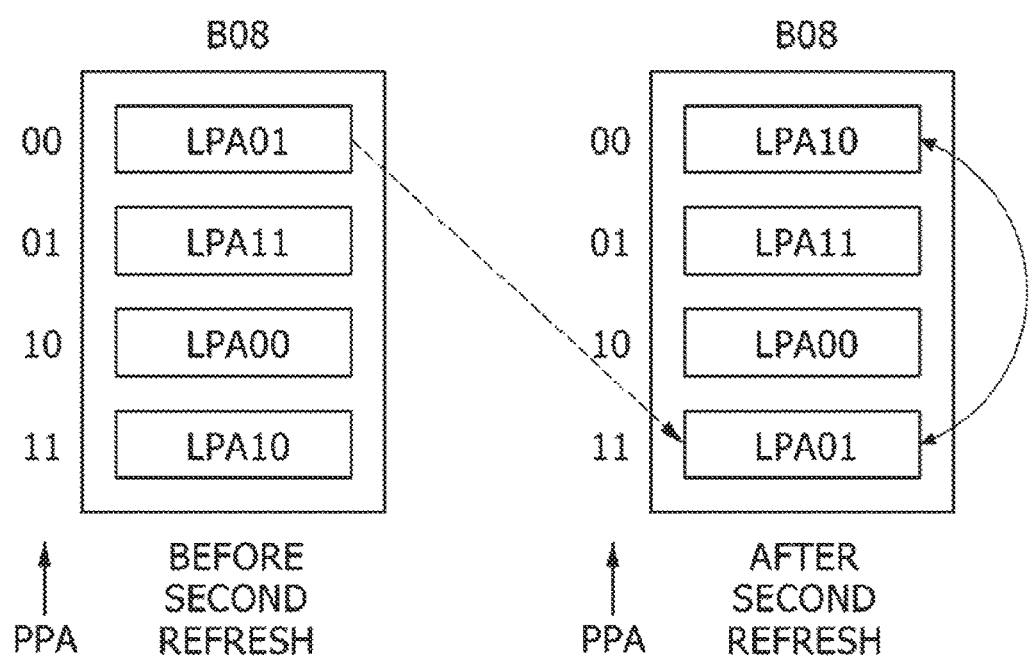

FIGS. 3 to 5 are views illustrating a local wear-leveling operation by a local wear-leveler (211 of FIG. 2) of a memory apparatus according to an embodiment of the present disclosure. For example, FIG. 3 is a view illustrating a refresh round in which the local wear-leveling operation is performed, and FIGS. 4 and 5 are views illustrating a process of remapping a physical page address in the refresh round. In an embodiment, the local ware-leveling operation may be performed in, for example but not limited to, a storage block B08 composed of, for example but not limited to, four pages. However, the embodiments may be similarly applied to a storage block composed of a larger number of pages, for example, 64 pages. Additionally, the embodiments may be similarly applied to a different storage block besides or in addition to storage block B08.

Firstly, referring to FIG. 3, the local wear-leveling operation by the local wear-leveler 211 may be configured such that a refresh operation is performed at the end of a refresh interval preconfigured in units of, for example, four write requests. The number of the refresh operations may be substantially the same as the number of pages in the local wear-leveling target block. A first refresh performed at the end of a first refresh interval may be performed for a first logical page address LPA=00. A second refresh performed at the end of a second refresh interval may be performed for a second logical page address LPA=01. A third refresh performed at the end of a third refresh interval may be performed for a third logical page address LPA=10. And, a fourth refresh performed at the end of a fourth refresh interval may be performed for a fourth logical page address LPA=11. The refresh process may include, for example but not limited to, an exclusive OR (hereinafter referred to as "XOR") operation of a logical page address (LPA) and a current key, and the physical page address may be remapped to a resultant value of the XOR operation. In an embodiment, for example, the refresh process may include other logic operations of a LPA and a current key, and the physical page address may be remapped to a resultant value of the logic operation or operations.

Referring to FIG. 4, for example, if the current key is binary data "10", the result of the XOR operation of the first logical page address "00" of the target storage block B08 and the current key "10" becomes "10" in the first refresh operation, and the resultant value of the XOR operation becomes a remapped physical page address (PPA). Accordingly, page data stored in the physical page address "01" is remapped to a physical page address "10" of the same storage block B08. Also, page data of the logical page address "11" stored in the physical page address (PPA) "10" is moved to a physical page address "01". That is, the page data stored in the physical page address "10" and the page data stored in the physical page address "01" are replaced with each other by the first refresh operation.

Referring to FIG. 5, in the second refresh operation, a result of the XOR operation of the second logical page address "01" of the target storage block B08 and the current key "10" becomes "11", and the resultant value of the XOR operation becomes the remapped physical page address. Accordingly, page data stored in the physical page address "00" is remapped to a physical page address "11" of the same storage block B08. Also, page data of the logical page address "01" stored in a physical page address "11" is moved to a physical page address "00". That is, the page data stored in the physical page address "11" and the page data stored in the physical page address "00" are replaced with each other by the second refresh operation.

In the third refresh operation, the result of the XOR operation of the third logical page address "10" of the target storage block B08 and the current key "10" becomes "00". Accordingly, page data stored in the physical page address "01" is remapped to the physical page address "10" of the same block B08. However, such an address remapping has been already performed by the second refresh operation, thus the third refresh operation may be ignored. In the fourth refresh operation, the result of the XOR operation of the fourth logical page address "11" of the target storage block B08 and the current key "10" becomes "00". Accordingly, page data stored in the physical page address "01" is remapped to the physical page address "10" of the same storage block B08. However, such an address remapping has been already performed by the first refresh operation, thus the fourth refresh operation may be ignored.

Figure 6:
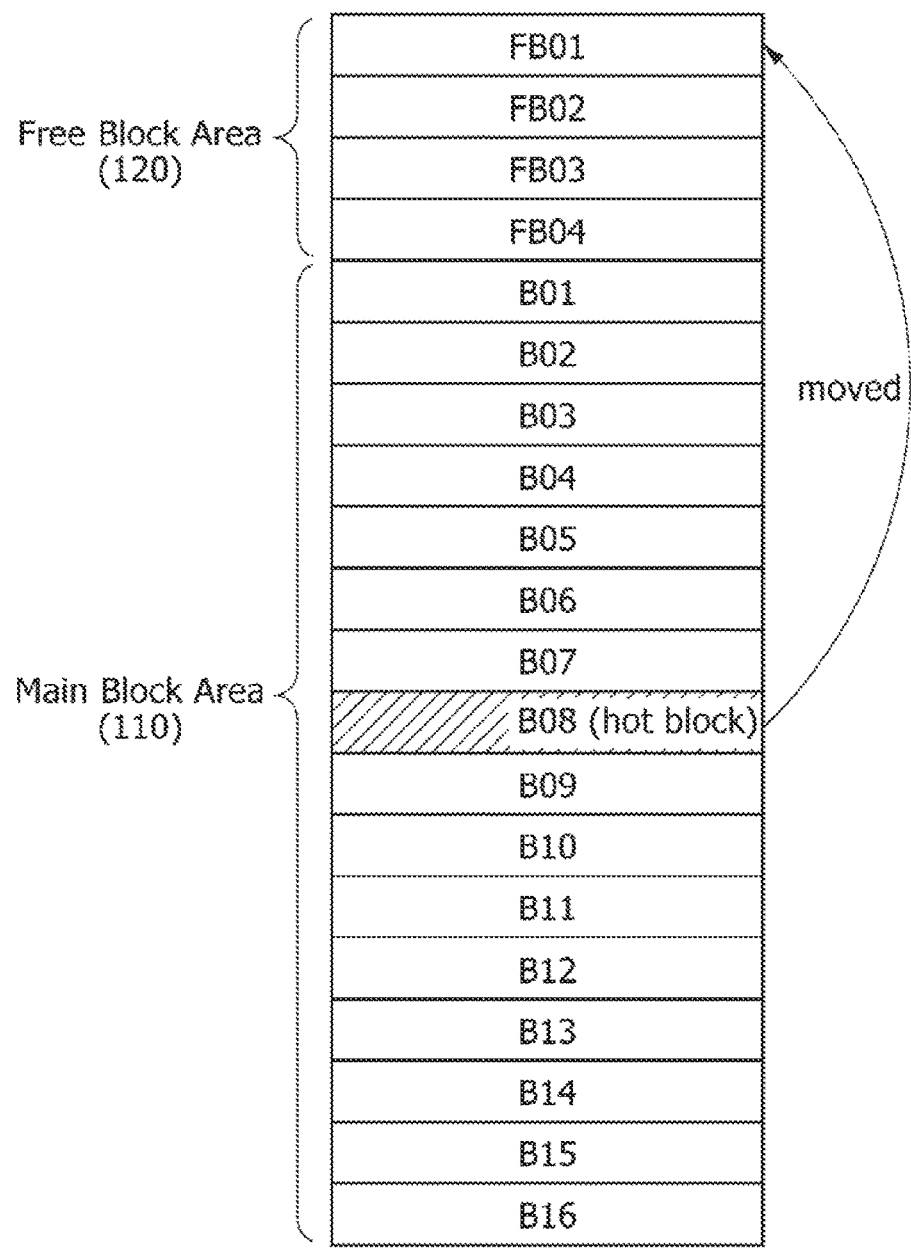
FIG. 6 is a view illustrating a block configuration of a nonvolatile memory in a first wear-leveling process of a memory apparatus according to an embodiment of the present disclosure.

FIG. 6 is a view illustrating a block configuration of a nonvolatile memory in a first global wear-leveling process of a memory apparatus according to an embodiment of the present disclosure. FIGS. 7 to 11 are views illustrating a process of remapping physical page addresses in the first global wear-leveling operation of the memory apparatus according to an embodiment of the present disclosure.

Referring to FIG. 6, in case that an eighth storage block B08 among storage blocks B01-B16 in a main block area 110 is detected as a hot block, block data stored in the eighth storage block B08 is moved to one of free blocks FB01-FB04 in a free block area 120. In an embodiment, it is assumed that the block data is moved to a first free block FB01, and thus the first free block FB01 is used as a victim block. In an embodiment, detection of the hot block may be performed using a bloom filter. The bloom filter uses two hash functions to associate two counter values for a single mapping address. These counter values are updated in such a way that, when a write request is inputted, the two counter values associated with the mapping address corresponding to the logical address requested to be written are incremented. If all the counter values associated with the current mapping address in the bloom filter exceed a preconfigured value, a block of the mapping address is determined as a hot block, otherwise, the block is classified as a cold block.

Figure 7:
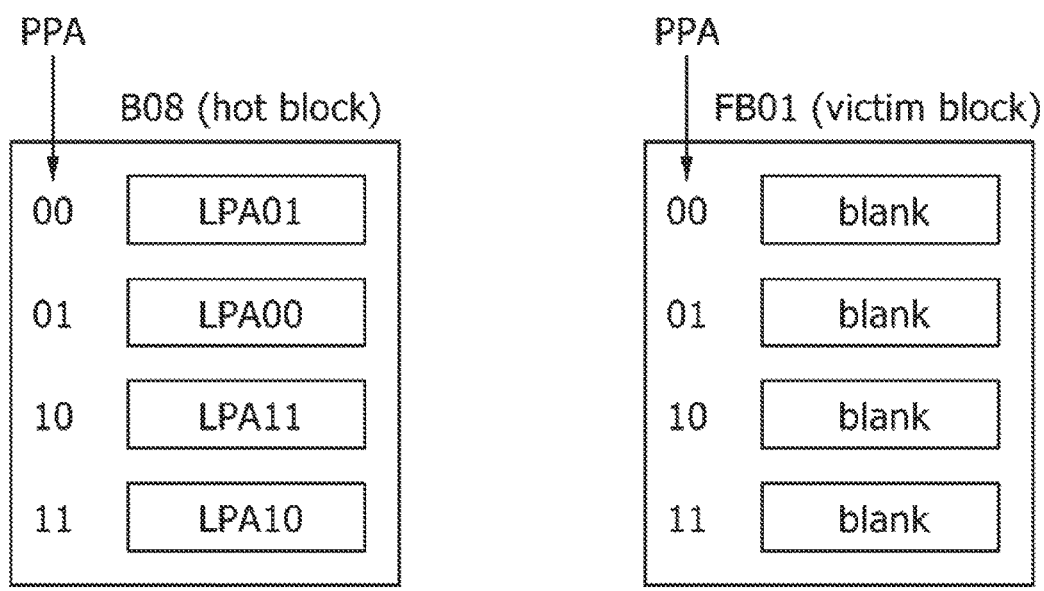
FIGS. 7 to 11 are views illustrating a remapping operation for physical page addresses in a first wear-leveling process of a memory apparatus according to an embodiment of the present disclosure.

In a process of moving block data of the eighth storage block B08 as the hot block to the first free block FB01 as the victim block, address remapping by security refresh may be performed. For simplicity of explanation, in an embodiment, four pages are arranged in each block. Firstly, as illustrated in FIG. 7, page data of a logical page address "01" is stored in an area corresponding to a physical page address "00" of the eighth storage block B08 which is the hot block before data movement. Also, page data of logical page addresses "00", "11" and "10" is stored in areas corresponding to physical page addresses "01", "10" and "11" of the eighth storage block B08 which is a hot block, respectively. The arrangement of areas corresponding to the logical page addresses stored in the area corresponding to each of the physical page addresses in the eighth storage block B08 can be found using information in the block metadata (240 in FIG. 2), as described with reference to FIG. 2. The areas corresponding to the physical page addresses "00", "01", "10" and "11" of the first free block FB01 as a victim block are in empty states like the remaining free blocks FB02-FB04.

Figure 8:
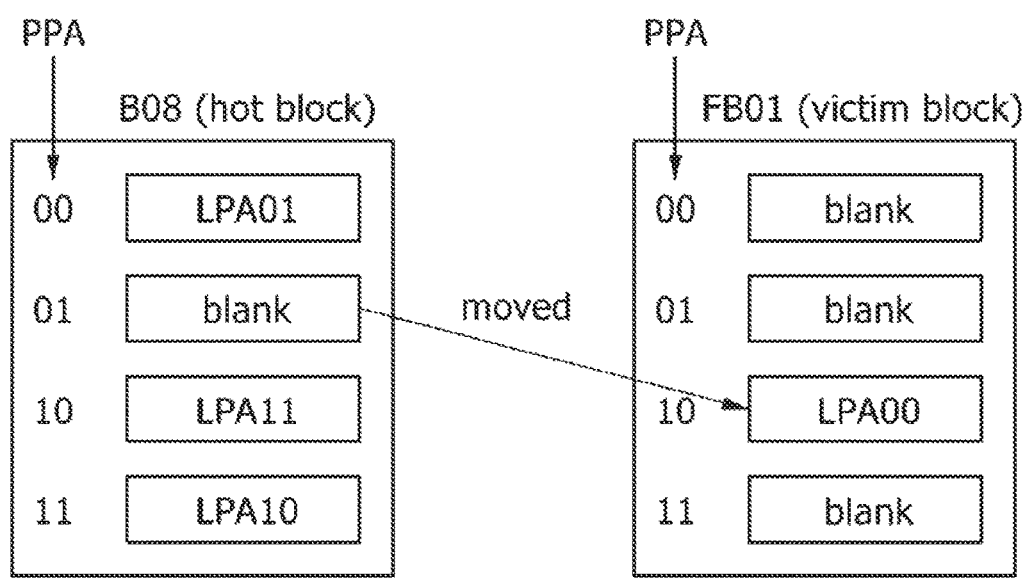

In this state, when a first global wear-leveling is started, a first refresh operation using a current key is performed to move page data. The current key may be randomly generated by a key generation device. In an embodiment, it is assumed that the current key is, for example, binary data "10". As illustrated in FIG. 8, a result of, for example, the XOR operation of a first logical page address "00" of the eighth storage block B08 and the current key "10" is "10", and this resultant value "10" of the XOR operation becomes a remapped physical page address. Accordingly, page data stored in the physical page address "01" (i.e., the page data of the logical page address "00") of the eighth storage block B08 is moved to a physical page address "10" of the victim block FB01. And, a page area corresponding to the physical page address "01" of the eighth storage block B08 in which the moved page data has been stored becomes empty.

Figure 9:
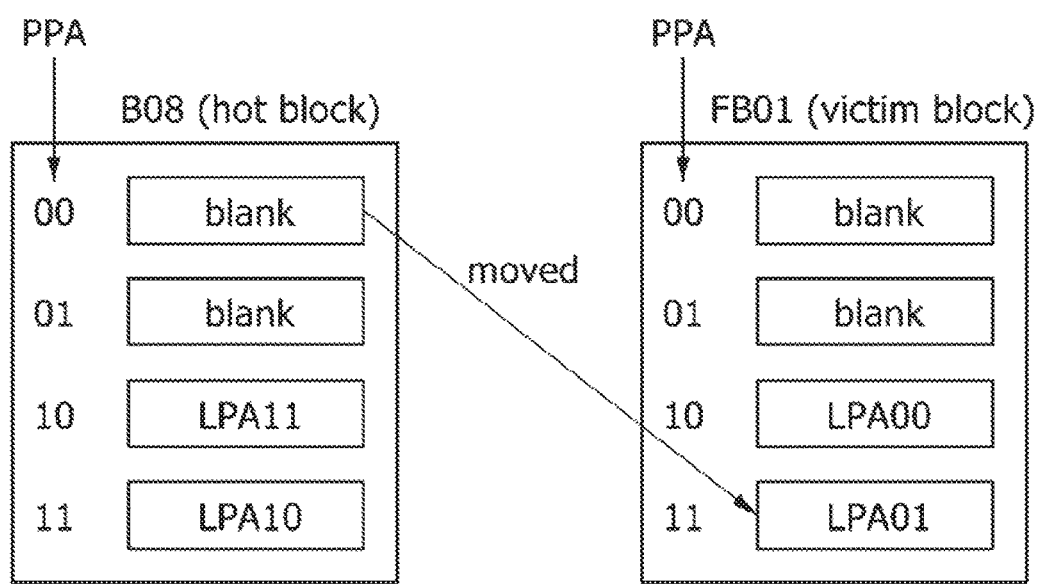

Referring to FIG. 9, in a second refresh operation, a result of the XOR operation of a second logical page address "01" of the eighth storage block B08 and the current key "10" is "11", and the resultant value "11" of the XOR operation becomes a remapped physical page address. Accordingly, page data stored in the physical page address "00" (i.e., the page data of the logical page address "01") of the eighth storage block B08 is moved to the physical page address "11" of the victim block FB01. And, a page area corresponding to the physical page address "00" of the eighth storage block B08 in which the moved page data has been stored becomes empty.

Figure 10:
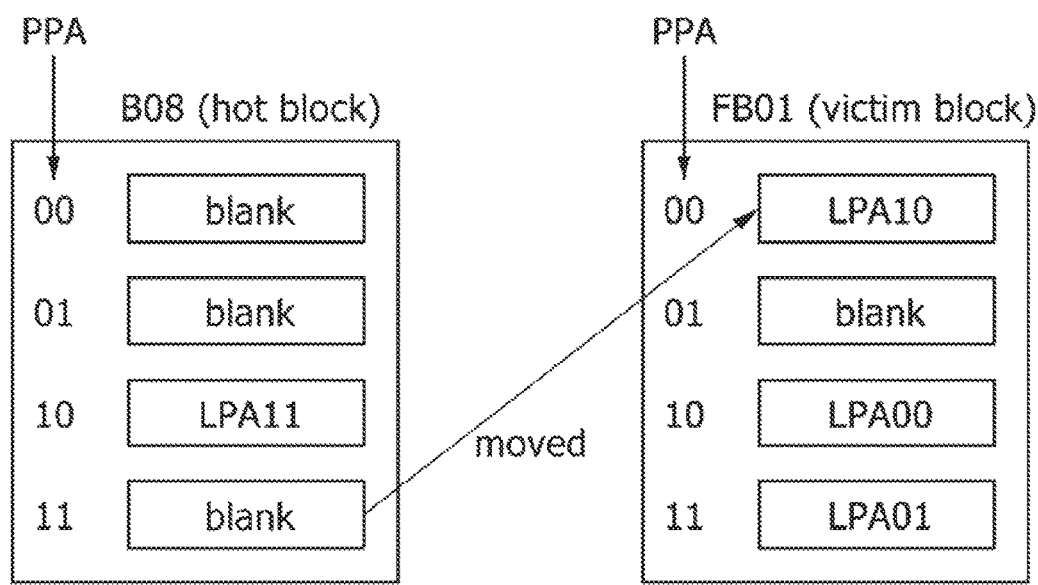

As illustrated in FIG. 10, in a third refresh operation, a result of the XOR operation of a third logical page address "10" of the eighth storage block B08 and the current key "10" is "00", and the resultant value "00" of the XOR operation becomes a remapped physical page address. Accordingly, page data stored in the physical page address "11" (i.e., the page data of the logical page address "10") of the eighth storage block B08 is moved to the physical page address "00" of the victim block FB01. And, a page area corresponding to the physical page address "11" of the eighth storage block B08 where the moved page data has been stored becomes empty.

Figure 11:
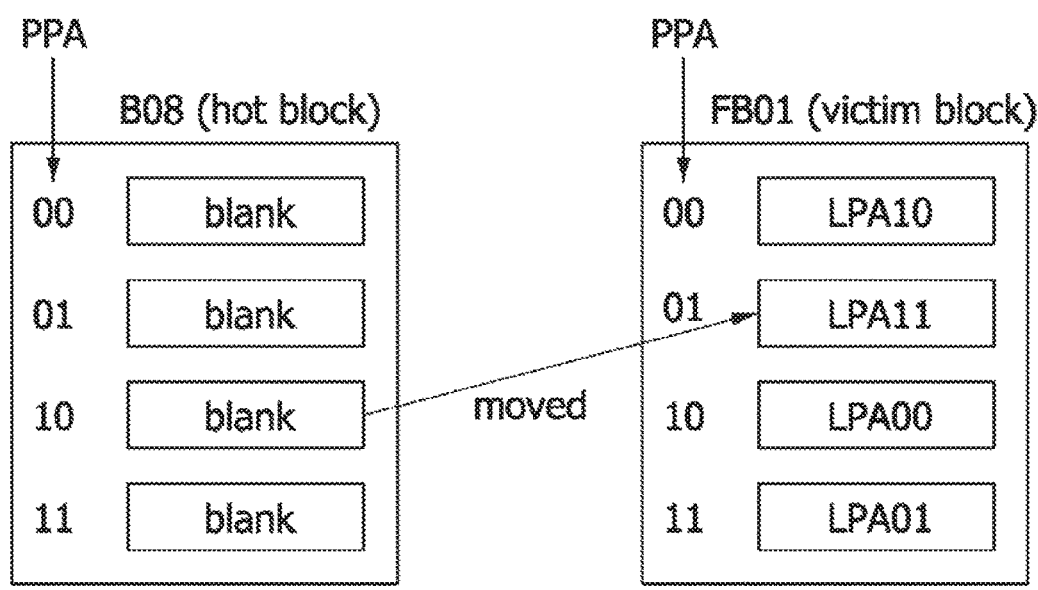

As illustrated in FIG. 11, in a fourth refresh operation, a result of the XOR operation of a fourth logical page address "11" of the eighth storage block B08 and the current key "10" is "01", and the resultant value "01" of the XOR operation becomes a remapped physical page address. Accordingly, page data stored in the physical page address "10" (i.e., the page data of the logical page address "11") of the eighth storage block B08 is moved to the physical page address "01" of the victim block FB01. And, a page area corresponding to the physical page address "10" of the eighth storage block B08 where the moved page data has been stored becomes empty.

Figure 12:
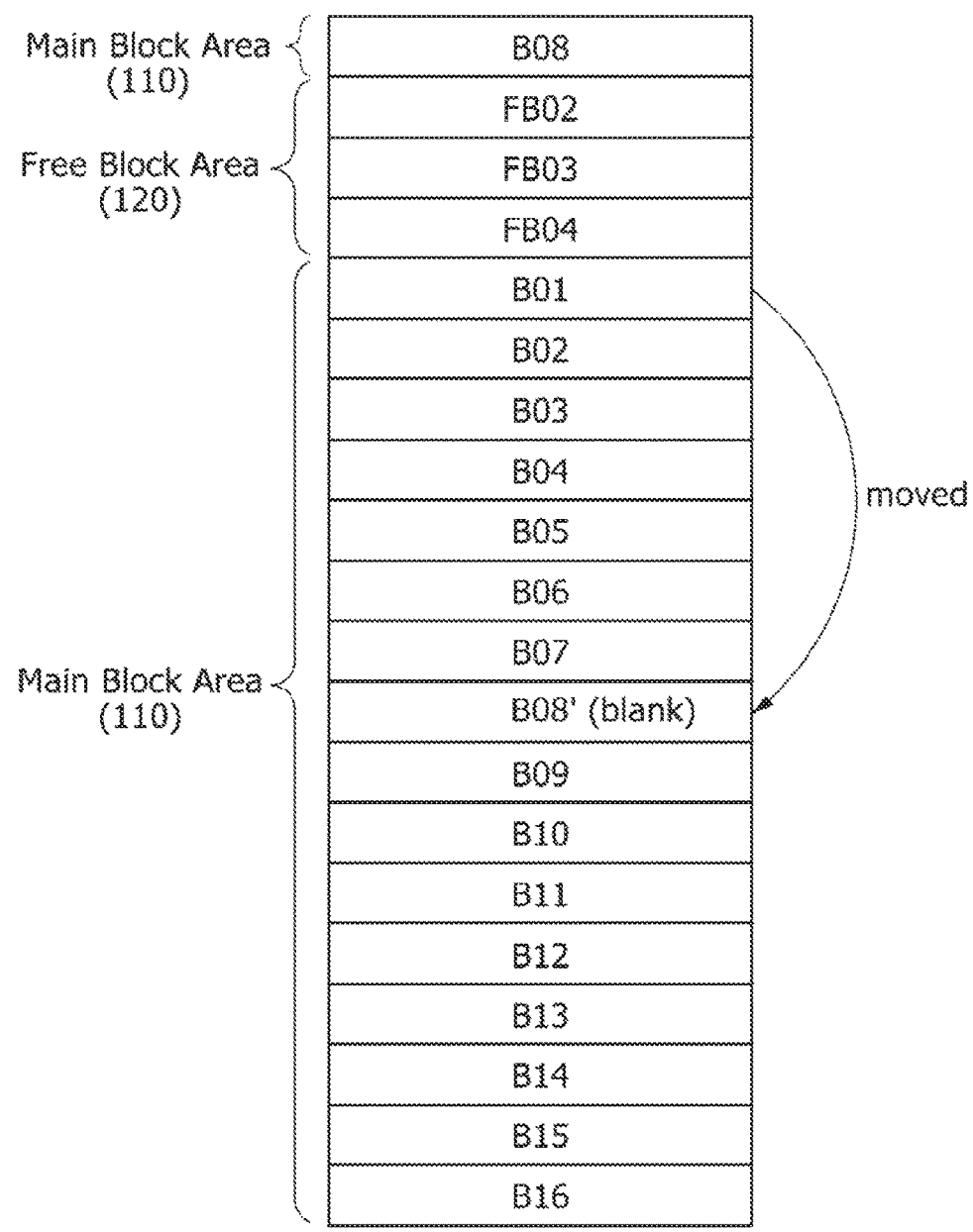
FIG. 12 is a view illustrating a block configuration of a nonvolatile memory in a second wear-leveling process of a memory apparatus according to an embodiment of the present disclosure.

FIG. 12 is a view illustrating a block configuration of a nonvolatile memory in a second wear-leveling process of a memory apparatus according to an embodiment of the present disclosure. FIGS. 13 to 17 are views illustrating a process of remapping physical page addresses in the second wear-leveling process of the memory apparatus according to an embodiment of the present disclosure. When the first global wear-leveling for moving all the data of the eighth storage block B08 as a hot block to the free block FB01 as a victim block has performed, as illustrated in FIG. 12, a storage block B08' which was the eighth storage block has become empty and an area which was the free block FB01 as a victim block has switched to the eighth storage block B08. In addition, the emptied eighth storage block B08' has been released from the hot block state. In this state, the main block area 110 is temporality expanded, while the free block area 120 is temporarily reduced. In order to restore the capacity of the free block area which is allocated in the design of the nonvolatile memory, a second global wear-leveling is performed to select one of the cold blocks among the storage blocks in the main block area 110 and move the data of the selected cold block to the empty storage block B08'. For example, in case that the first storage block B01 is a selected cold block, data of the first storage block B01 is moved to the empty storage block B08', as indicated by an arrow in the figure. This process may also be performed by applying a security refresh operation using a security refresh key.

Figure 13:
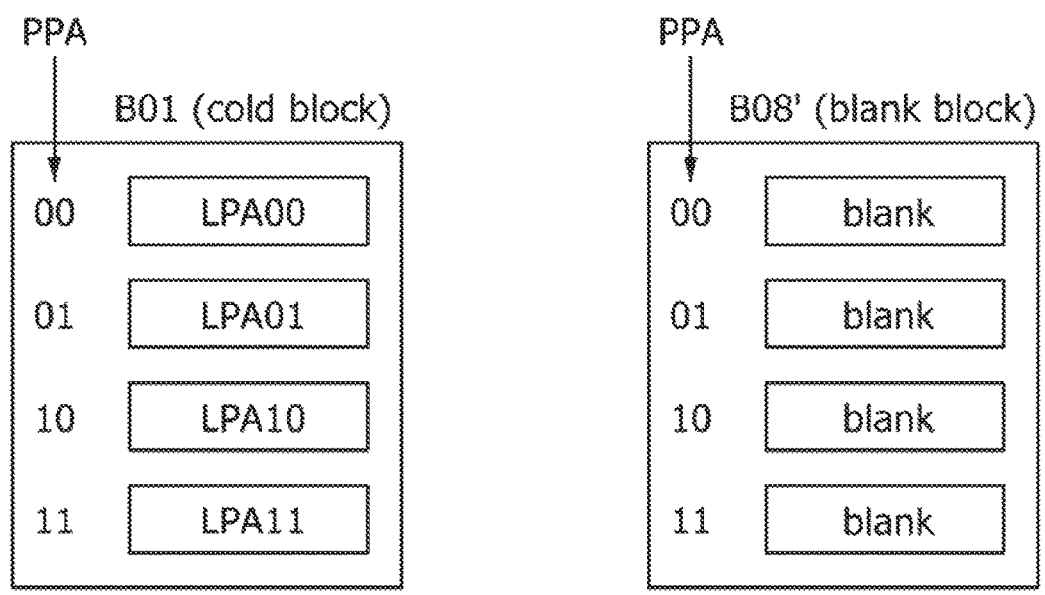
FIGS. 13 to 17 are views illustrating a remapping operation for physical page addresses in a second wear-leveling process of a memory apparatus according to an embodiment of the present disclosure.

Firstly, as illustrated in FIG. 13, page data of a logical page address "00" is stored in an area corresponding to a physical page address "00" of the first storage block B01 which is a cold block before the data movement. In addition, in areas corresponding to physical addresses "01", "10" and "11" of the first storage block B01 as a cold block, page data of logical page addresses "01", "10" and "11" is stored, respectively. The arrangement of the physical page addresses in the first storage block B01 may be determined by the local wear-leveling through the local wear-leveler (211 in FIG. 2), as described with reference to FIG. 2. In this process, associated metadata is stored in the block metadata (240 in FIG. 2). Accordingly, the arrangement of the areas corresponding to the logical page addresses stored in the area corresponding to each physical page address in the first storage block B01 can be found using information in the block metadata (240 in FIG. 2). The area corresponding to each of the physical page addresses PPA "00", "01", "10" and "11" of the empty storage block B08' that has released from the hot block state is in an empty state by data movement between blocks.

Figure 14:
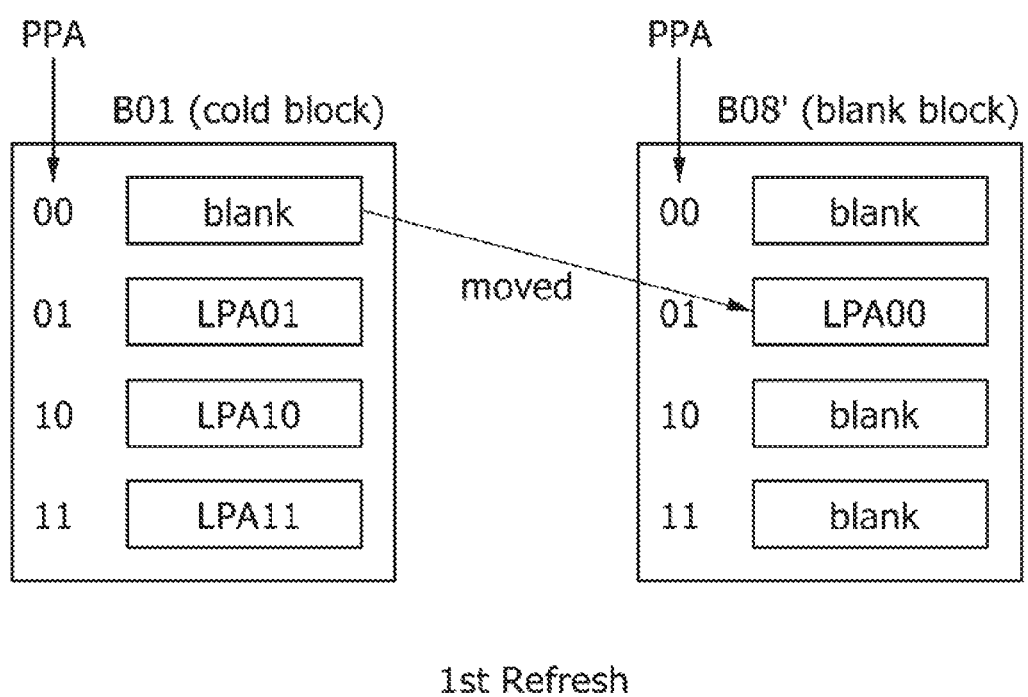

In this state, a refresh operation using a current key is performed to move the page data. The current key may be randomly generated by a key generation device. In an embodiment, it is assumed, for example, that the current key is binary data "01". As illustrated in FIG. 14, in a first refresh operation, a result of, for example, an XOR operation of the first logical page address "00" of the first storage block B01 and the current key "01" is "01", and the resultant value "01" of the XOR operation becomes a remapped physical page address. Accordingly, page data stored in the physical page address "00" of the first storage block B01 (i.e., the page data of the logical page address "00") is moved to the physical page address "01" of the empty storage block B08'. A page area corresponding to the physical page address "00" of the first storage block B01 in which the moved page data has been stored becomes empty.

Figure 15:
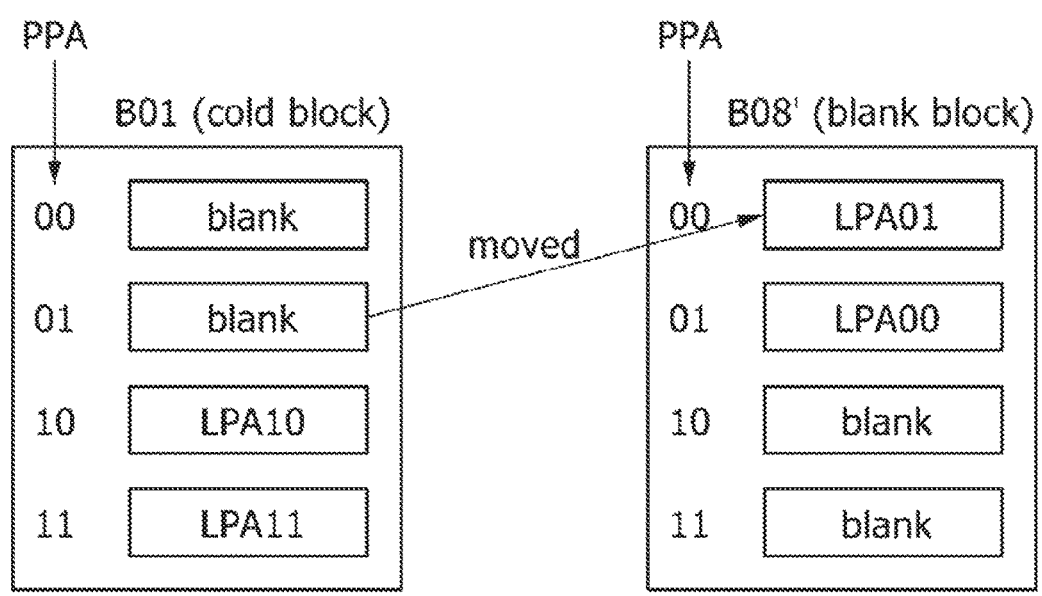

Referring to FIG. 15, in a second refresh operation, a result of the XOR operation of the second logical page address "01" of the first storage block B01 and the current key "01" is "00", and the resultant value "00" of the XOR operation becomes a remapped physical page address. Accordingly, page data stored in the physical page address "01" of the first storage block B01 (i.e., the page data of the logical page address "01") is moved to the physical page address "00" of the empty storage block B08'. A page area corresponding to the physical page address "01" of the first storage block B01 in which the moved page data has been stored becomes empty.

Figure 16:
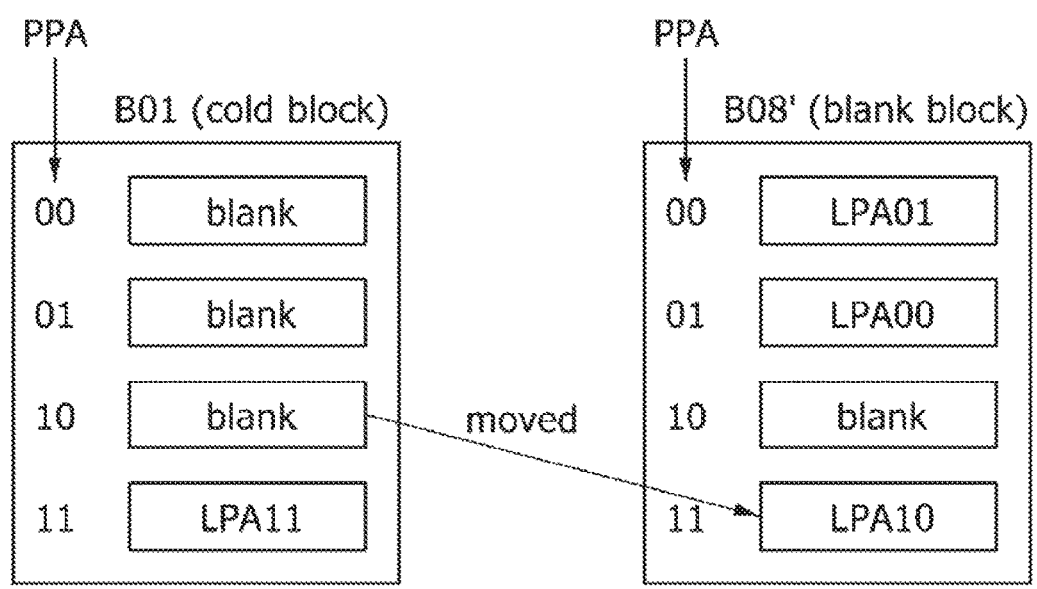

Referring to FIG. 16, in a third refresh operation, a result of the XOR operation of the third logical page address "10" of the first storage block B01 and the current key "01" is "11", and the resultant value "11" of the XOR operation becomes a remapped physical page address. Accordingly, page data stored in the physical page address "10" of the first storage block B01 (i.e., the page data of the logical page address "10") is moved to the physical page address "11" of the empty storage block B08'. A page area corresponding to the physical page address PPA "10" of the first storage block B01 in which the moved page data has been stored becomes empty.

Figure 17:
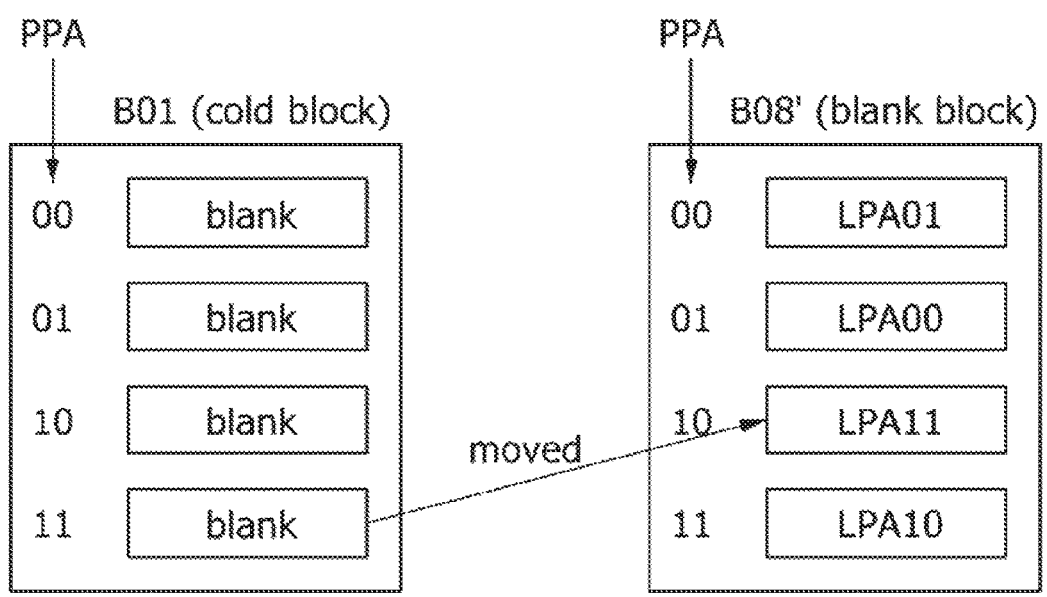

Referring to FIG. 17, a result of the XOR operation of the fourth logical page address "11" of the first storage block B01 and the current key "01" is "10", and the resultant value "10" of the XOR operation becomes a remapped physical page address. Accordingly, page data stored in the physical page address "11" of the first storage block B01 (i.e., the page data of the logical page address "11") is moved to the physical page address "10" of the empty storage block B08'. A page area corresponding to the physical page address "11" of the first storage block B01 in which the moved page data has been stored becomes empty.

Figure 18:
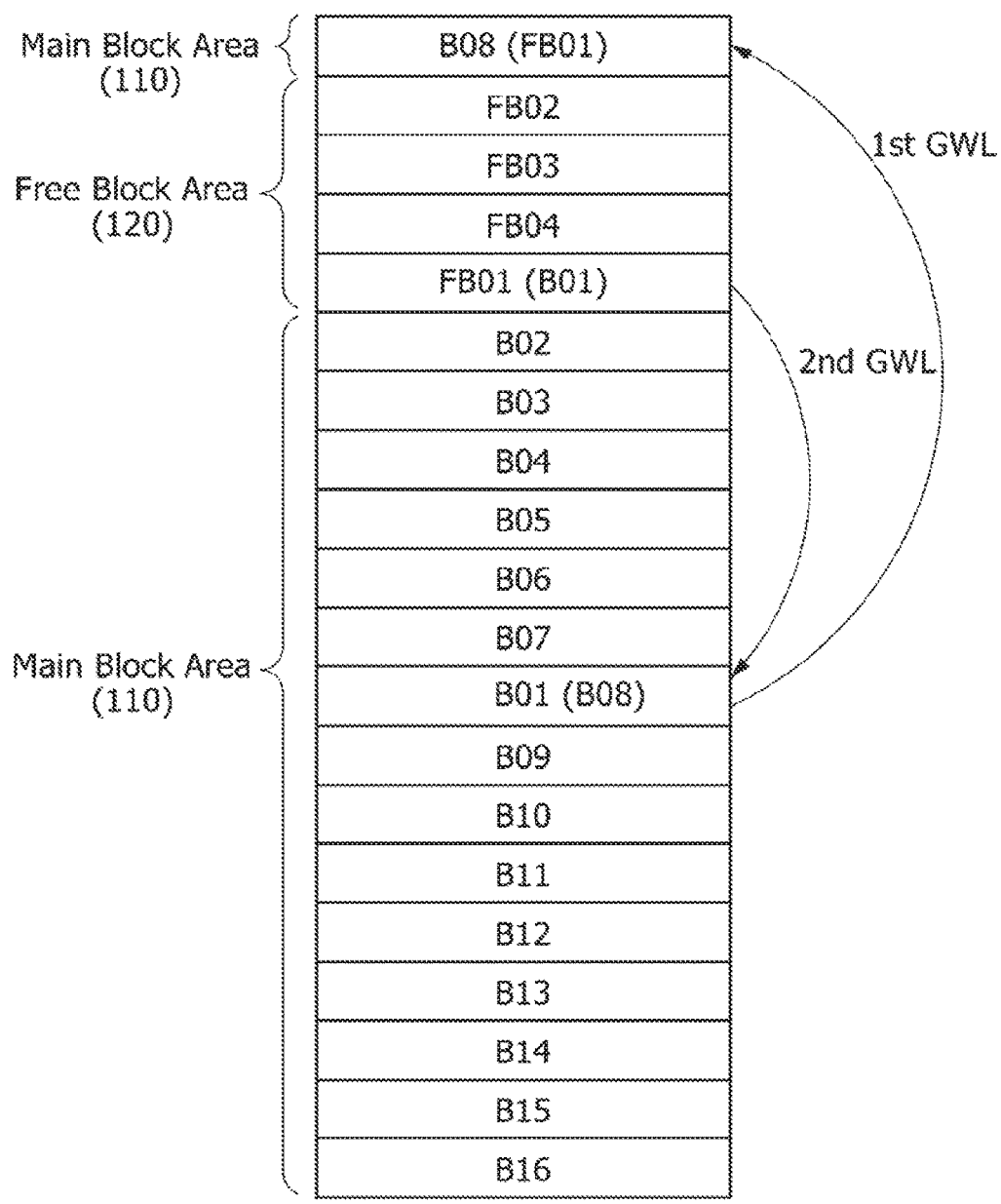
FIG. 18 is a view illustrating a block configuration of a nonvolatile memory after a wear-leveling process of a memory apparatus according to an embodiment of the present disclosure.

FIG. 18 is a view illustrating a block configuration of a nonvolatile memory after a wear-leveling process of a memory apparatus according to an embodiment of the present disclosure is ended. Referring to FIG. 18, when the second global wear-leveling for moving all the data of the first storage block B01 as a cold block to the empty eighth storage block B08' which has been released from a hot block is performed, the eighth storage block B08' becomes a first storage block B01 and the empty storage block B01 is switched to the first free block FB01. Accordingly, the free block area 120 includes all of the four free blocks FB01-FB04, thereby restoring all initial capacity from the temporarily reduced capacity. Likewise, the main block area 110 includes all 16 storage blocks B01-B16, thereby restoring a normal state from the temporarily expanded state.

As indicated by the arrows in FIG. 18, the current eighth storage block B08 is composed of data moved to the previous first free block FB01 form the existing eighth storage block B08 by the first global wear-leveling. Accordingly, even if the existing eighth storage block B08 is a hot block, since the previous first free block FB01 was empty, the current eighth storage block B08 can be released from the hot block state. Furthermore, since the first global wear-leveling is performed by applying a security refresh process using a refresh key, even if write operations are concentrated on a specific area due to, for example but not limited to, a malicious attack, the failure of the nonvolatile memory can be prevented.

Likewise, the current first storage block B01 is composed of data moved to the existing eighth storage block B01 from the previous first free block FB01 by the second global wear-leveling. Since the previous eighth storage block B08 that was previously a hot block was empty by the first global wear-leveling and the existing first storage block in which the moved data has been stored was a cold block, the hot block releasing state by the first global wear-leveling can be maintained. Even in this case, since the second global wear-leveling is performed by applying the security refresh process using a refresh key, even if write operations are concentrated on a specific area due to, for example but not limited to, a malicious attack, the failure of the nonvolatile memory can be suppressed.

Although the embodiments of the present application as described above illustrate and describe the drawings, it is intended to illustrate what is being suggested by the present application and is not intended to limit what is presented in the present application in a detailed form.

What is claimed is:

1. A method of wear-leveling of a memory apparatus, the method comprising:
    allocating a plurality of storage blocks and a plurality of free blocks in a memory; and
    performing a first global wear-leveling to move data of a first storage block, which is a hot block among the storage blocks, to a first free block among the free blocks, a result of a logic operation of a logical page address of each of pages in the first storage block and a first security refresh key being remapped to a physical page address of each of pages in the first free block.

2. The method of claim 1, wherein each of the storage blocks is allocated as a block in which data is stored, and each of the free blocks is allocated as an empty block in which no data is stored.

3. The method of claim 1, wherein the first security refresh key is randomly generated.

4. The method of claim 1, further comprising:
    performing a second global wear-leveling to move data of a second storage block, which is a cold block among the storage blocks, to the first storage block emptied by the first global wear-leveling, after performing the first global wear-leveling.

5. The method of claim 4, wherein performing the second global wear-leveling includes remapping the result of the logic operation of a logical page address of each of pages in the second storage block and a second security refresh key to a physical page address of each of pages in the first free blocks.

6. The method of claim 4, further comprising:
    switching the second storage block emptied by the second global wear-leveling to a free block.

7. The method of claim 1, further comprising:
    performing a local wear-leveling to move data in units of pages in any one of the storage blocks.

8. The method of claim 5, wherein performing a local wear-leveling includes remapping a result of a logic operation of a logical page address of each of pages in the storage blocks and a third security refresh key to a physical page address of each of the pages in the storage blocks.

9. The method of claim 8, wherein the third security refresh key is randomly generated.

10. The method of claim 1, further comprising:
    determining the hot block rather than a cold block if counter values associated with a current mapping address corresponding to a logical address requested to be written to exceed a preconfigured value.

* * * * *